United States Patent [19]
Bombard et al.

[11] Patent Number: 6,023,508
[45] Date of Patent: Feb. 8, 2000

[54] POLYMORPHIC DATA STRUCTURES FOR SECURE OPERATION OF A VIRTUAL CASH SYSTEM

[75] Inventors: Thomas J. Bombard; John J. Hassett, both of Marblehead, Mass.

[73] Assignee: Currency Scientific, Inc., Marlbehead, Mass.

[21] Appl. No.: 08/861,628

[22] Filed: May 22, 1997

[51] Int. Cl.[7] .................................................. H04L 9/32
[52] U.S. Cl. .............................. 380/24; 380/4; 380/21; 705/41
[58] Field of Search ...................... 380/3, 4, 25; 705/68, 705/69; 713/200; 235/379; 364/408

[56] References Cited

U.S. PATENT DOCUMENTS

| | | | |
|---|---|---|---|
| 4,303,904 | 12/1981 | Chasek | 340/23 |
| 4,630,201 | 12/1986 | White | 364/408 |
| 4,689,478 | 8/1987 | Hale et al. | 235/380 |
| 4,906,828 | 3/1990 | Halpern | 235/379 |
| 5,175,416 | 12/1992 | Mansvelt et al. | 235/379 |
| 5,420,405 | 5/1995 | Chasek | 235/379 |
| 5,835,726 | 11/1998 | Shwed et al. | 395/200.59 |

OTHER PUBLICATIONS

Dickson et al., "European Bank Insight," Smith Barney Report, pp. 2–28 (Apr. 15, 1997).

*Primary Examiner*—Tod R Swann
*Assistant Examiner*—Todd Jack
*Attorney, Agent, or Firm*—Lahive & Cockfield, LLP

[57] ABSTRACT

A system for transferring value carrying data packets representative of cash between transferor and transferee terminals without the intervention of a centralized database provides for data packets convertible between an inspected state and an uninspected state. Data packets in an inspected state can be negotiated between terminals once, whereupon they become uninspected and hence, non-negotiable. Uninspected data packets are restored to inspected state by having a central bank compare a hash code generated by a transferor terminal against a corresponding hash code generated by the central bank.

13 Claims, 5 Drawing Sheets

POLYMORPHIC DATA STRUCTURES FOR SECURE OPERATION OF A VIRTUAL CASH SYSTEM

This invention relates to a combination of methods which together implement a system for the electronic transfer of value combining the anonymity and decentralized nature of cash transactions with the security and fraud-resistant features of credit card transactions.

BACKGROUND

Systems for transferring value have evolved in two directions. In one direction, represented by credit cards, each value-transferring transaction is individually authorized online by a centralized clearinghouse and recorded at the time of the transaction. Authorization typically consists of verifying whether the account number read from the card has sufficient credit to engage in the proposed transaction. These systems are typically usable for a broad variety of transactions involving different vendors. In the other direction, represented by prepaid phone cards or subway tickets having a remaining value encoded on a magnetic stripe, there is no record of individual transactions. Inspection is performed off-line without a central clearinghouse by verifying that sufficient value for the transaction is physically encoded on the card. These systems typically can be used for transactions involving only a limited number of vendors.

Recently, "smart cards" having a microprocessor embedded in the card have been developed. These permit a variety of accounts to be encoded on a single card. This permits value to be added to as well as removed from a variety of accounts. A smart card is therefore typically equivalent to a plurality of one of the cards described above.

A recent innovation is the Mondex card used to create an electronic form of currency. A system using the Mondex card permits a user of the system to transfer a data packet representative of cash to another user of the system in such a way that the recipient of the data packet can transfer it again to yet another user of the system, for value, or to a bank, for credit to an account. Unlike the credit card systems described above, the Mondex system permits transactions to take place off-line without the intervention of any centralized clearinghouse. Unlike the debit card systems described above, the cash equivalents circulating in a Mondex system can be used to pay a variety of different vendors.

The Mondex system falls short of implementing a true replacement for physical cash. In the Mondex system, cash is never actually minted. It is merely recognized as value being depositable in a bank. In addition, security is limited and rudimentary. There exists no effective way to authenticate the circulating data packets and to detect counterfeits.

There exists a need, therefore, for a system of circulating data packets representative of cash in which an authentication mechanism reliably detects counterfeit data packets.

SUMMARY

The present invention provides for a secure system for circulating a data packet representative of a cash note between a plurality of terminals. The system includes methods for creating and destroying the data packet and methods for negotiating the data packet from a transferor terminal to a transferee terminal in a secure manner. As part of the negotiation process, the system provides a method for periodically inspecting the data packet to assure its authenticity and its integrity.

The data packet representing the cash note can exist in one of two circulation states. In the non-circulating state, transfer of the data packet from one terminal to another is restricted. In the circulating state, the data packet can exist in one of two inspection states: an inspected state, in which it can be freely transferred from one terminal to another, and an uninspected state in which transfer from one terminal to another is restricted.

The data packet includes an encrypted record permanently associated with the note and a cleartext record which can be altered by the terminal having possession of the data packet. It is by suitably altering the cleartext record that a terminal changes the inspection state or the circulation state of the data packet.

The encrypted record includes a serial number, which uniquely identifies the data packet, and an original face value, which indicates the denomination of the cash note. Additionally, the encrypted record can include means to identify the creator of the data packet and means to identify the terminal requesting the data packet. A private key is used to encrypt the encrypted record.

The cleartext record contains a field identifying the inspection state of the data packet, a field specifying the current face value of the data packet, and, optionally, a field specifying the circulation state of the data packet. In the inspected state, the cleartext record includes a key which can be used by a transferor terminal to generate a signature corresponding to that key. In the uninspected state, the cleartext record includes the signature generated by the transferor terminal using the key.

A record of the existence and status of a data packet is stored in a validation database. This validation database is updated during the lifetime of the data packet to reflect changes such as changes in inspection status, circulation status, or in the value remaining in the data packet.

The system includes five types of transactions. These transactions differ in the changes made to either the circulation state or the inspection state of the data packet. The five transactions are:

minting, which includes generating the data packet's encrypted record and attaching to it a cleartext record which places the data packet into a non-circulating state;

withdrawing, which includes altering the cleartext record to place the non-circulating data packet into a circulating and inspected state;

negotiating, which includes altering the cleartext record to place the circulating and inspected data packet into an uninspected state;

inspecting, which can include, if the data packet passes inspection, altering the cleartext record to place the circulating and uninspected data packet into an inspected state depositing, which includes altering the cleartext record to place the circulating data packet into a non-circulating state.

The system includes five types of terminals which differ in the types of transactions they can engage in. These are:

central banks, which can mint data packets and which maintain validation databases of data packets in circulation;

account custodians, which can change the circulation state of a data packet and which can restore an uninspected data packet to its inspected state;

personal terminals, which can change a data packet from being in an inspected state to being in an uninspected state;

home-based terminals, which, by communicating with an account custodian, can restore an uninspected data packet into its inspected state; and vendor terminals, which can place the data packet into an uninspected state, and which, by communicating with an account custodian, can restore the data packet into its inspected state.

Minting

Minting is the process of creating a data packet representative of a cash note. The process of minting is typically performed by a central bank terminal at the request of another terminal, typically an account custodian. The account custodian usually specifies the cash value of a data packet to be minted. The central bank then checks the account custodian's credit. If the account custodian's credit is deemed satisfactory, the central bank creates the data packet by assembling the parts as described above. The central bank then updates a database to indicate that it has created a new data packet.

The new data packet, in a non-circulating state, is then transferred to the requesting account custodian.

Withdrawing

Withdrawing a data packet is accomplished by having a cash data packet transferred from a dispensing terminal to a withdrawing terminal. Normally, the dispensing terminal is an account custodian or a terminal in communication with an account custodian, such as a home-based terminal.

The dispensing terminal alters the cleartext record of the data packet to be withdrawn in order to place it into a circulating state and into an inspected state. The data packet, now in a circulating and inspected state, is transferred to the withdrawing terminal, typically a personal terminal.

Negotiating

During negotiation of the cash data packet, the transferor terminal, usually a personal terminal, alters the cleartext record of an inspected cash data packet, thereby placing it in an uninspected state, and transmits it to a transferee terminal. The cash data packet will then exist in the transferee terminal, most often another personal terminal, in an uninspected state.

Because a data packet is negotiable only in its inspected state, the transferee terminal will not be able to negotiate the data packet to another terminal until an inspecting terminal inspects the data packet in the manner described below and restores it to its inspected state.

As is often the case in cash transactions, the purchase price of the good may not correspond to the inspected data packets, either singly or in combination, available to pay for the goods. Under these circumstances, it becomes necessary to subdivide the data packets, thereby making available a combination of data packets having a denomination corresponding to the purchase price of the goods. This process, commonly referred to as "making change," is a feature of another embodiment of the invention.

To make change, the data packet representative of a cash data packet is duplicated into a first data packet to be spent and a second data packet to be retained. The value of the data packet to be spent is set to the purchase price of the goods. The value of the data packet to be retained is set to the value of the data packet prior to the transaction less the purchase price. Both the data packet to be spent and the data packet to be retained have the same encrypted record. The data packet to be spent is then negotiated in the manner set forth above.

Inspecting

During inspection of the cash note, the terminal requesting inspection, for example a personal terminal, transfers the note to an inspecting terminal, which could be an account custodian. The inspecting terminal decodes the transferor's signature from the note's cleartext record to recover its corresponding key. This enables the inspecting terminal to recover the note in the form it was in before the transferor terminal transferred it. The inspecting terminal can then compare the recovered note against a copy of the note as stored in a validation database of circulating notes maintained by a central bank terminal. If the stored copy of the note is consistent with that presented for inspection, the inspecting terminal alters the cleartext record of the note to place it back in the inspected state and sends the inspected note back to the terminal requesting the inspection. The inspecting terminal then causes the validation database of circulating notes to be updated with the inspected note so that a copy of the note will be available when that note is next presented for inspection.

Depositing

A depositing terminal, typically a personal terminal or a vendor terminal, can also deposit the note, for credit, into an account at a financial institution. It does so by transferring the note to a terminal in communication with an account custodian, or to the account custodian itself. In one embodiment, the depositing terminal is a personal terminal which transfers the note to a home-based terminal in communication with an account custodian. In another embodiment, the depositing terminal is a vendor terminal which transfers the note directly to an account custodian.

Upon receipt of the note to be deposited, the account custodian causes the note to be removed from circulation, causes the database of circulating notes to be updated to reflect the removal of the note from circulation, and causes the depositing terminal's account to be credited by the amount shown as the current face value of the note being deposited.

These and other features, aspects and advantages of the invention will be better understood with reference to the following description, the appended claims, and the accompanying drawings in which:

DESCRIPTION

Figure 1:
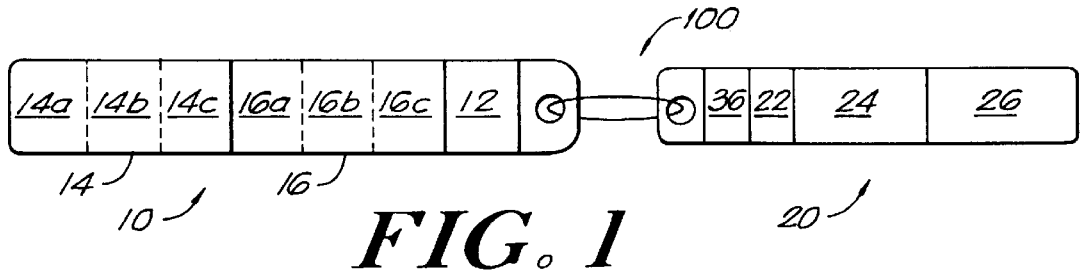
FIG. 1 shows a data packet in its inspected state.
Figure 2:
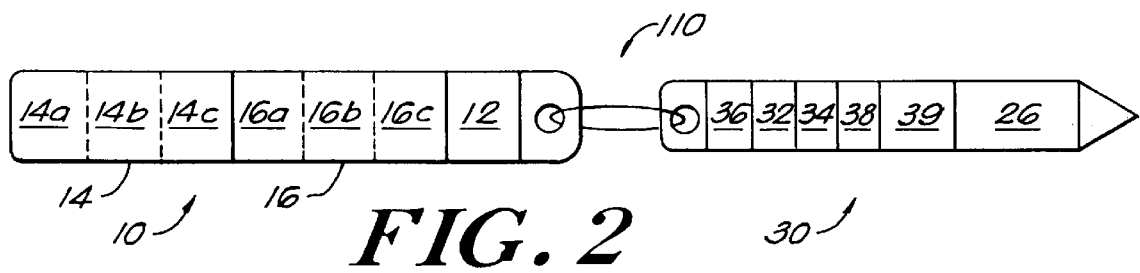
FIG. 2 shows the data packet of FIG. 1 in its uninspected state.

A data packet representative of a cash note to be used in a system embodying the invention can exist as an inspected data packet 100, as shown in FIG. 1, or as an uninspected data packet 110 as shown in FIG. 2. In both its inspected state and its uninspected state, the data packet includes two parts: an encrypted cash serial number 10 which remains the same for the life of the data packet; and a cleartext or unencrypted section whose contents depend on whether the data packet is in an inspected state or an uninspected state. The cleartext portion switches between being a validation check number 20 when the data packet is in an inspected state, as shown in FIG. 1, and a transfer authorization number 30 when the data packet is in an uninspected state, as shown in FIG. 2.

Referring to FIG. 1, the encrypted cash serial number 10 includes a denomination field 12 indicating the original value of the cash note represented by the data packet and, optionally, the currency used to measure that value. The cash serial number 10 can also include a central bank identification field 14 identifying when and where the data packet was minted. This central bank identification field 14 may include: a central bank identification number 14a uniquely identifying the central bank which minted the data packet; a minting time stamp 14b showing the date and time that the data packet was minted; and a central bank sequence number 14c which can be incremented by the central bank to further identify the data packet.

The encrypted cash serial number 10 can also include an account custodian identification field 16 to identify the account custodian that requested the minting of the data packet. The account custodian identification field 16 can include: an account custodian identification number 16a uniquely identifying the account custodian requesting the data packet; a requesting time stamp 16b indicating the date and time at which the account custodian requested minting of the data packet; and an account custodian sequence number 16c which can be incremented by the account custodian.

In the inspected state, shown in FIG. 1, the unencrypted section of the data packet has a validation check number 20 which includes: an inspection check number 24, which is an arbitrary number assigned by the central bank upon minting the data packet; a remaining value field 22, which indicates the value remaining in the data packet and which is always less than or equal to the value shown in the denomination field 12; and a transfer authorization key 26 which is a random number used to convert a data packet in an inspected state into a data packet in an uninspected state in a manner to be described below.

The validation check number 20 can also include a circulation field 36 for specifying whether the data packet is in a circulating state or in a non-circulating state. In the preferred embodiment, the most significant bit of the remaining value field 22 is used as the circulation field 36 of the data packet.

Figure 3:
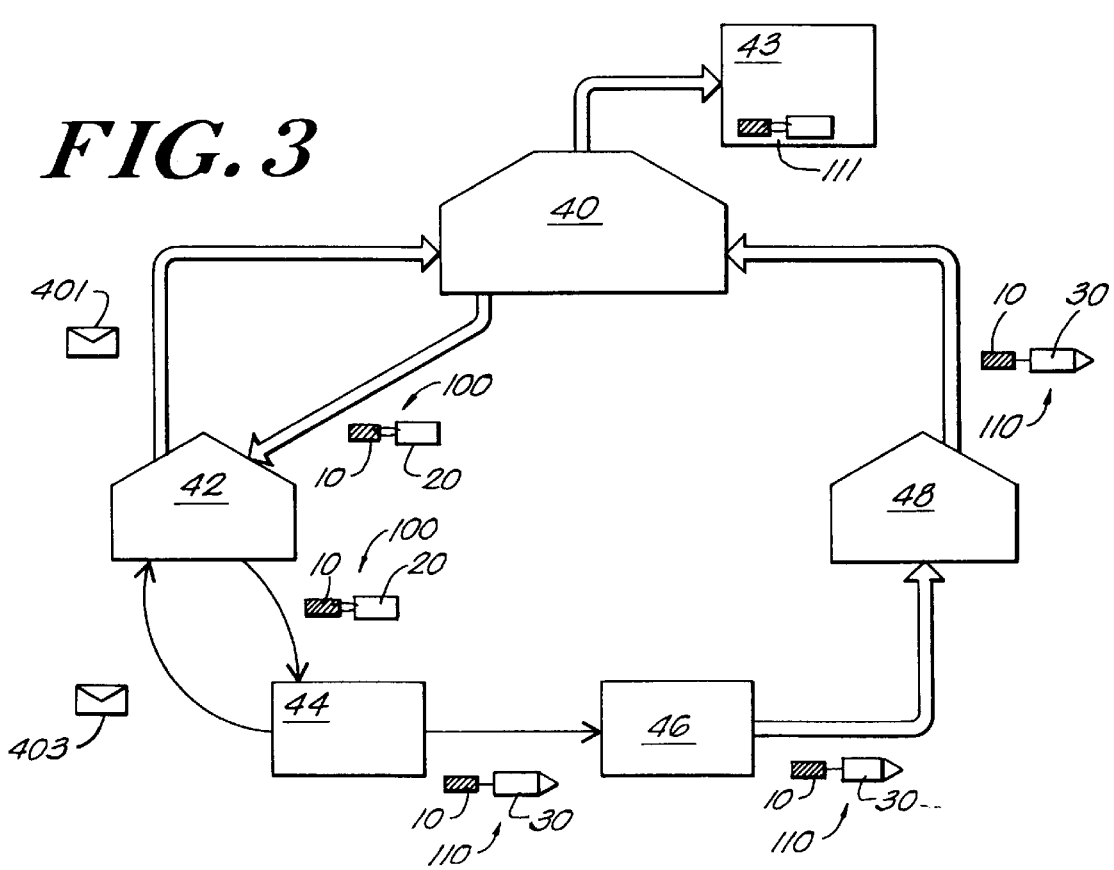
FIG. 3 shows the overall circulation of the data packet of FIG. 1 as it makes its way from a minting central bank, to a consumer carrying a personal terminal who then purchases an item from a vendor by using the vendor's vendor terminal.

FIG. 3 shows one possible life cycle of a data packet as it circulates through the stream of commerce. In FIG. 3 an account custodian 42 maintains an inventory of data packets having various denominations for withdrawal by a personal terminal 44. When the number of data packets having a particular denomination falls below a predetermined threshold, software running on the account custodian for the purpose of monitoring the inventory of data packets triggers a request for additional data packets. The account custodian 42 then transmits the request for data packets to a central bank 40. In response to this request, software executed by the central bank 40 mints the requested data packets and transmits them to the account custodian 42. The central bank also executes software instructions to create an entry in a validation database 43 corresponding to the data packet. The account custodian holds each data packet in non-circulating and uninspected form in memory until a personal terminal 44 requests a data packet.

The personal terminal's request for a data packet can originate when a human operator brings the personal terminal 44 into communication with an account custodian 42 and specifies the number and denomination of data packets to the personal terminal through its user-interface. Communication between the personal terminal and the account custodian can be effected by a telephone or by other cable linking them. Communication between the human operator and the personal terminal 44 can occur by providing the personal terminal with a menu system or pointing device, by providing it with a keyboard or keypad which can have predefined keys for common functions, or by leading the human operator through a transaction with on-screen instructions presenting options which can be chosen by means of a keyboard, keypad, or pointing device. In response to the human operator's request, the personal terminal 44 then transmits a message representative of the request to the account custodian 42.

Upon receiving a request from the personal terminal, software running on the account custodian 42 fetches a data packet from memory and alters the circulation field 36 to indicate that it is now in a circulating state. The account custodian then transmits the data packet to the personal terminal 44.

The next step occurs when a human operator uses the personal terminal 44 to pay for the purchase of goods or services from a vendor terminal 46. This can occur when the human operator interacts with the personal terminal's human interface to specify the amount of value to be negotiated to the vendor terminal 46. The vendor terminal 46 has means to determine that the value negotiated by the personal terminal 44 is consistent with the value of the goods or services being purchased. For example, the human operator of the personal terminal 44 can scan goods across a bar code reader in communication with the vendor terminal 46 thereby communicating the value of the goods to the vendor terminal 46. The vendor terminal can also accomplish this by having a human operator communicate appropriate instructions through the vendor terminal's user-interface in the same manner that a human operator communicates instructions to a personal terminal 44. In either case, the vendor terminal 46 executes software instructions required to accept delivery of the uninspected packet from the personal terminal 44.

The vendor terminal can then deposit the data packet, now in uninspected form as a result of negotiation, by transmitting it to a depository account custodian 48, which can be either a different account custodian 48, as illustrated, or the same account custodian 42. This requires that the vendor terminal execute software instructions to establish communication with the account custodian, to specify the data packets to be deposited, and to specify an account into which value corresponding to those data packets should be credited. This step can be initiated manually, by having a human operator communicate the appropriate instructions through the vendor terminal's user-interface, or automatically at predetermined intervals.

The depository account custodian 48 then transmits the data packet to the central bank 40 for inspection, in a manner set forth below. If the data packet passes inspection, the central bank 40 withdraws it from circulation by deleting its corresponding entry in the validation database and issues a credit to the account specified by the vendor terminal 46.

Figure 4:
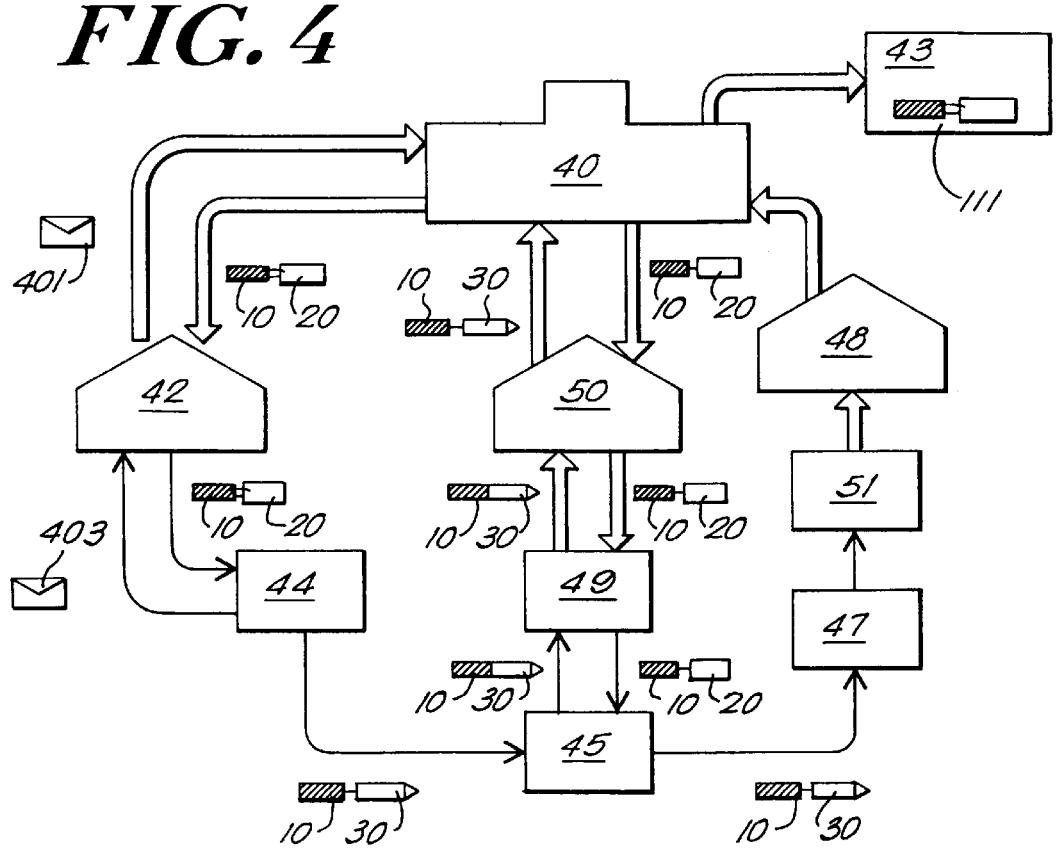
FIG. 4 shows the overall circulation of the data packet in FIG. 1 with the additional step of negotiation from one personal terminal to another.

FIG. 4 shows another possible life cycle of a data packet. As was the case in FIG. 3, the data packet enters circulation upon withdrawal from the account custodian 42 by the personal terminal 44. The personal terminal 42 then negotiates the data packet to a second personal terminal 45, thereby placing the data packet in an uninspected state. Before the second personal terminal 45 can negotiate the data packet to a third personal terminal 47, it must have the data packet inspected. It does so by presenting the data packet to a home based terminal 49 which is in communication with the central bank 40 through an account custodian 50. The data packet is transferred to the central bank, inspected, and transmitted back to the second personal terminal 45 in inspected form. The second personal terminal can then negotiate the inspected data packet to a third personal terminal 47. This third personal terminal deposits the data packet for credit to an account by presenting it to another home-based terminal 51 which is in communication with the central bank 40 through a depository account custodian 48 as described in connection with FIG. 3.

FIGS. 3 and 4 illustrate just two of the many possible life-cycles of a value carrying data packet in the system of the invention. Each life-cycle includes the fundamental steps of minting, withdrawing, negotiating, inspecting and depositing. These fundamental steps and their interactions will be discussed in more detail below.

Upon receiving a minting request 401 from an account custodian 42, a central bank 40 executes software instructions which verify that the account custodian 42 is sufficiently creditworthy to receive a data packet having the requested denomination. If the central bank deems the account custodian creditworthy, it initiates the minting process by executing additional software instructions which assemble a data packet 100 having an encrypted cash serial number 10 and a validation check number 20 as shown in FIG. 1.

Referring to FIG. 1, the validation check number 20 incorporates the information transmitted by the account custodian 42 as part of the minting request 401. The software instructions executed by the central bank 40 for assembling a data packet initially set the remaining value field 22 to the same value as that stored in the denomination field 12 and set the circulation field 36, in this case the most significant bit in the remaining value field 22, to indicate that the data packet is in the non-circulating state.

After assembly, the central bank 40 transmits the data packet 100 to the account custodian 42 and updates a validation database 43 to indicate the existence and current state of the newly minted data packet 100. The data packet 100 continues to reside, in an inspected and non-circulating state, with the account custodian 42 until the account custodian receives a withdrawal request 403 from a personal terminal 44 specifying a denomination to be withdrawn and an account from which to withdraw it.

When the account custodian 42 receives a withdrawal request 403 from a personal terminal 44, the account custodian first determines whether the personal terminal is authorized to withdraw a data packet having the requested denomination. This requires that the account custodian determine that the account from which value is to be debited has sufficient value to debit. If the account custodian determines that the personal terminal 44 is authorized to withdraw a data packet having the specified denomination, it chooses a data packet 100 having the requested denomination and changes its circulation status field 36 to indicate that the data packet is in a circulating state. The account custodian 42 then communicates the identity of the data packet placed into circulation to the central bank 40, thereby triggering the execution of software instructions by the central bank which update the validation database 43. Finally, account custodian transmits the data packet 100 to the personal terminal 44.

Figure 5:
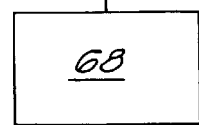
FIG. 5 shows two ways in which the data packet of FIG. 1 can enter circulation.

FIG. 5 depicts two withdrawal mechanisms in the illustrated embodiment. Withdrawal can occur when an account custodian 62 transfers a data packet directly to a personal terminal 64. Alternatively, withdrawal can occur when a home-based terminal 66 in communication with an account custodian and having a user-interface similar to that of an automated teller machine acts as an intermediary between the account custodian 62 and a personal terminal 68.

The data packet 100, now in its circulating and inspected state, resides in the personal terminal 44 until it is "negotiated" to another terminal. Negotiation is the transfer of a data packet from a transferor terminal, typically a personal terminal 44, to a transferee terminal, typically a vendor terminal 46 as shown in FIG. 3 or another personal terminal 45 as shown in FIG. 4. A salient feature of the negotiation method of the invention is that it involves only a transferor terminal and a transferee terminal with no intervention by a centralized database. Another salient feature of the negotiation method is that the data packet is transformed from an inspected state 100, in which it is freely negotiable, to an uninspected state 110, in which it is non-negotiable.

Figure 6A:
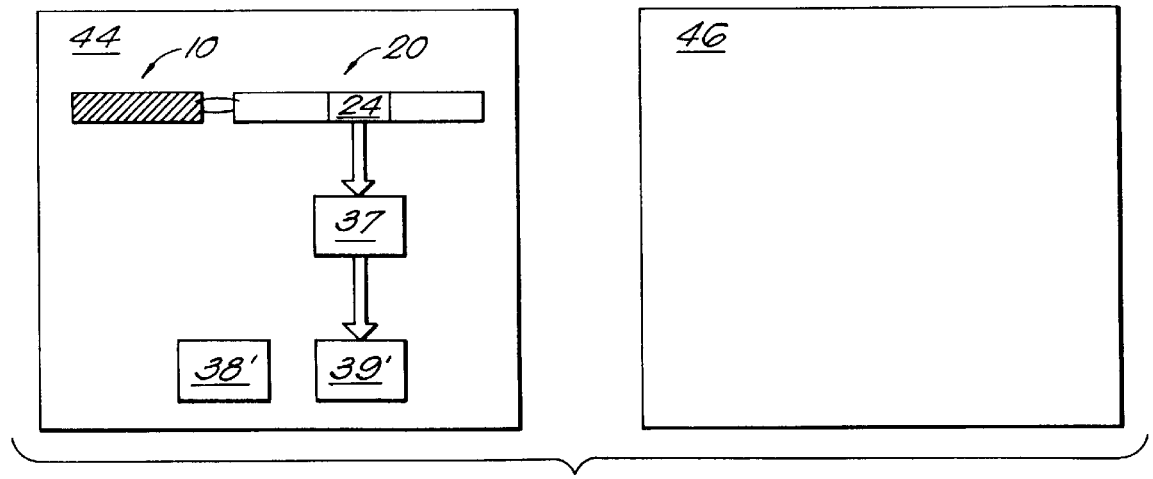
FIGS. 6A–6C show the steps by which an inspected data packet as shown in FIG. 1 is negotiated from one terminal to another, thereby turning it into the uninspected data packet of FIG. 2.
Figure 6B:
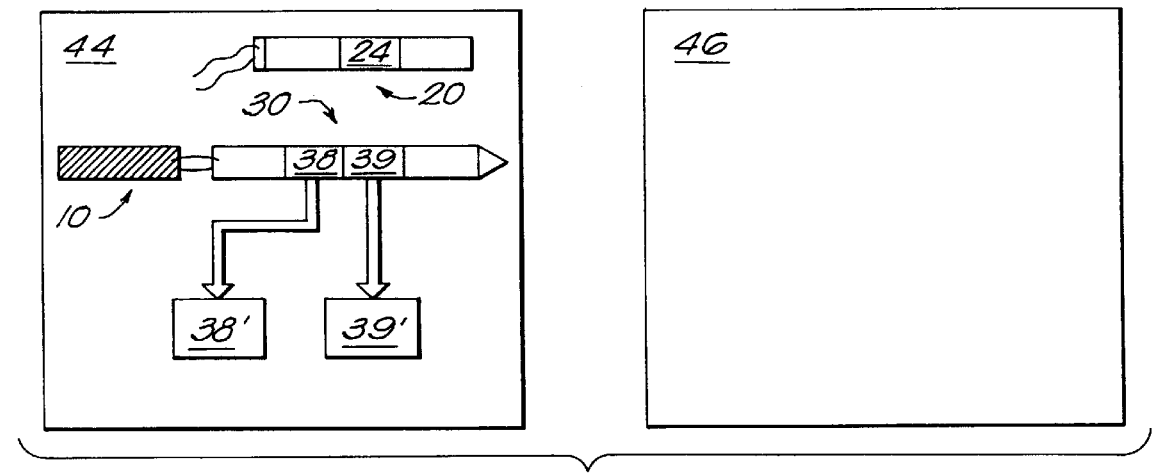

The negotiation method begins when the transferor 44 uses a cryptographic algorithm 37 and the transfer authorization key 24 of the inspected data packet 100 to generate a hash code as shown in FIG. 6A. The transferor then replaces the entire validation check number 20 of the inspected data packet 100 with a transfer authorization number 30 as shown in FIG. 6B. The hash code 39' generated by the transferor 44 is stored in the transfer hash field 39 of the transfer authorization number 30. A value to be negotiated 38' is then stored in the negotiated value field 38 of the transfer authorization number 30.

Referring to FIG. 2, the transfer authorization number 30 further includes: the personal terminal sequence number 32; a personal terminal time stamp 34 indicating the date and time of negotiation; and an inspection check number 26 which is an arbitrary number assigned by the central bank upon minting the data packet.

In many cases, the value to be negotiated 38' is less than the value found in the remaining value field 22. When this occurs, the transferor terminal replaces the original data packet with a data packet to be negotiated and a data packet to be retained, each having the same encrypted cash serial number 10. The transferor terminal then decrements the remaining value field 22 of the data packet to be retained by the value to be negotiated 38' and sets the negotiated value field 38 of the data packet to be negotaiated to the value to be negotiated 38'. The data packet to be negotiated is then treated as set forth above.

Figure 6C:
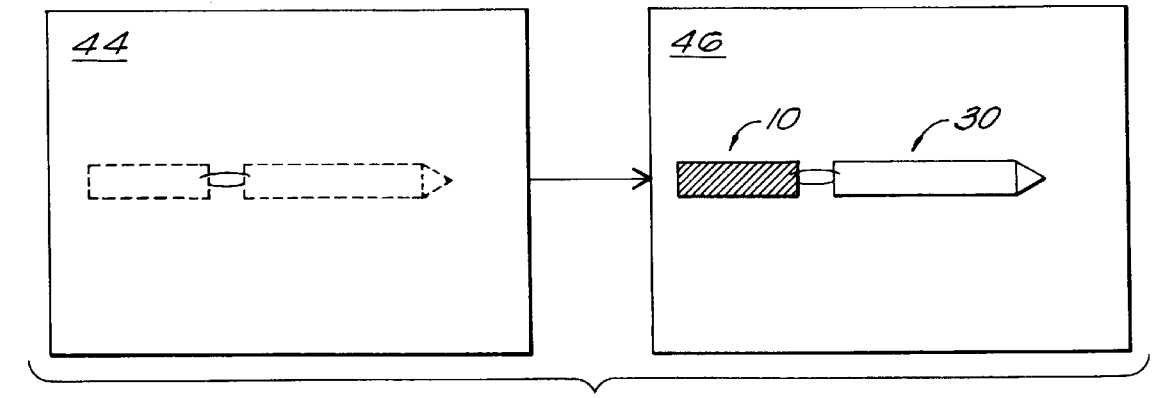

The negotiated data packet, now in its uninspected state, is then transferred to the transferee terminal 46 as shown in FIG. 6C. The transferee terminal 46 shown in FIG. 6C can be a vendor terminal 46, as shown in FIG. 3, or another personal terminal 45 as shown in FIG. 4. In either case, the transferee terminal 46 now has two choices: it can deposit the data packet into an account at a financial institution, as illustrated by FIG. 3, or it can further negotiate the data packet, as illustrated by FIG. 4.

Referring to FIG. 4, if a transferee terminal, in this case a second personal terminal 45, chooses to further negotiate the data packet, it must first have the data packet "inspected." Inspection is the process of verifying: that an entry corresponding to the data packet to be inspected exists in the validation database 43; that the transfer hash generated by the transferor terminal 44 and stored in the transfer hash field 39 is consistent with both the transfer authorization key 24 found in the validation database 43 and with the value 38' placed by the transferor terminal in the negotiated value field 38; and that the value transferred is not in excess of the value stored in the data packet's denomination field 12.

Figure 7A:
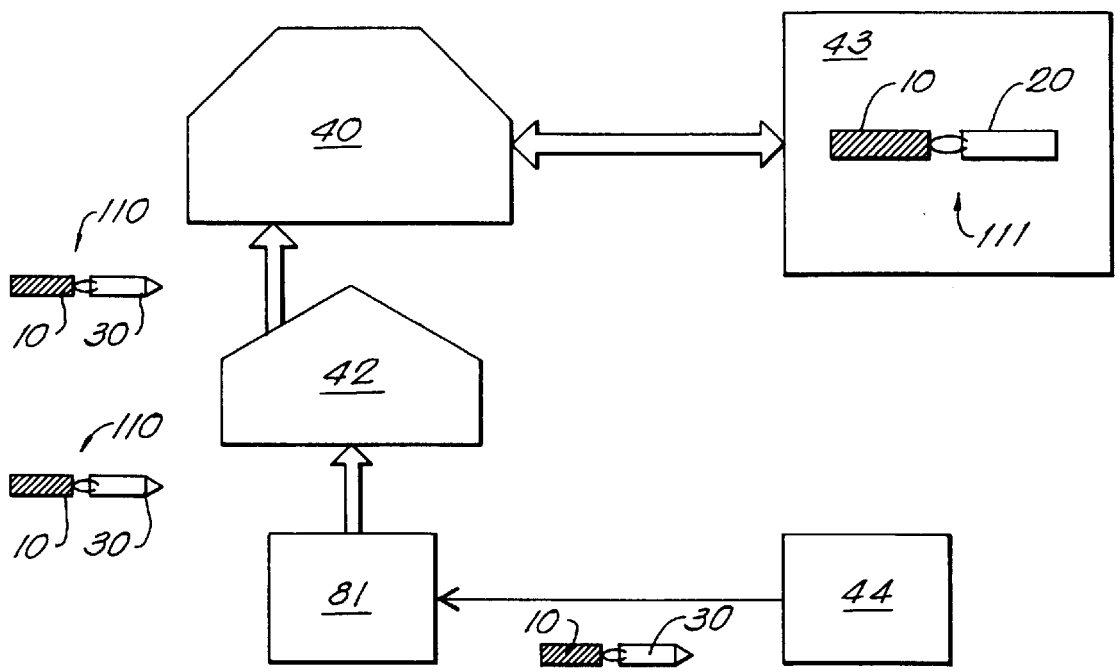
FIGS. 7A–7B show the steps by which the uninspected data packet of FIG. 6C can be restored to an inspected state.

FIG. 7A shows a typical configuration of terminals for inspecting a data packet. A personal terminal 44 is connected to an inspection terminal 81. An inspection terminal can be an account custodian, a home based terminal linked to an account custodian, or a vendor terminal linked to an account custodian. The inspection terminal 81 typically is linked to a central bank 40 by a secure communication channel.

Referring to FIG. 7A, the transferee terminal 44 initiates the inspection process by presenting the uninspected data packet 110 to an inspecting terminal 81. The inspecting terminal then presents the data packet 110 to the central bank 40 by way of an account custodian 42. The central bank 40 locates an entry 111 corresponding to the data packet in the validation database 43. This entry 111 will be a copy of the data packet as it appeared when it was last in an inspected state. As such, it will have the same cash serial number 10 as the uninspected data packet 110. However, since the entry 111 is a copy of the data packet in its inspected state, it will have a validation check number 20 in place of the uninspected data packet's transfer authorization number 30.

If the central bank 40 does not find a corresponding entry 111 in the validation data base 43, it rejects the data packet 110 by sending it back to the transferee terminal 44 in an uninspected state.

If the central bank does find a corresponding entry 111, it verifies that the negotiated value 38 in the data packet's transfer authorization number 30 is less than or equal to the original denomination 12 of the data packet.

Upon passing the above two tests, the central bank then verifies that the contents of the transfer hash field 39 contained in the uninspected data packet's transfer authorization number 30 correspond both to the transfer authorization key 24 stored in the corresponding entry 111 in the validation database 43 and to the negotiated value stored in the negotiated value field 38 of the uninspected data packet. It does so by evaluating the inverse of the cryptographic algorithm 37 used by the transferor terminal and verifying that the hash code in the transfer hash field 39 generates the correct transfer authorization key 24 and a negotiated value consistent with that found in the negotiated value field 38 of the uninspected data packet.

Failure of any one of the foregoing tests by the data packet 110 results in rejection of the data packet by the central bank 40. The rejected data packet 110 is then returned to the transferee terminal 44 in an uninspected state.

Figure 7B:
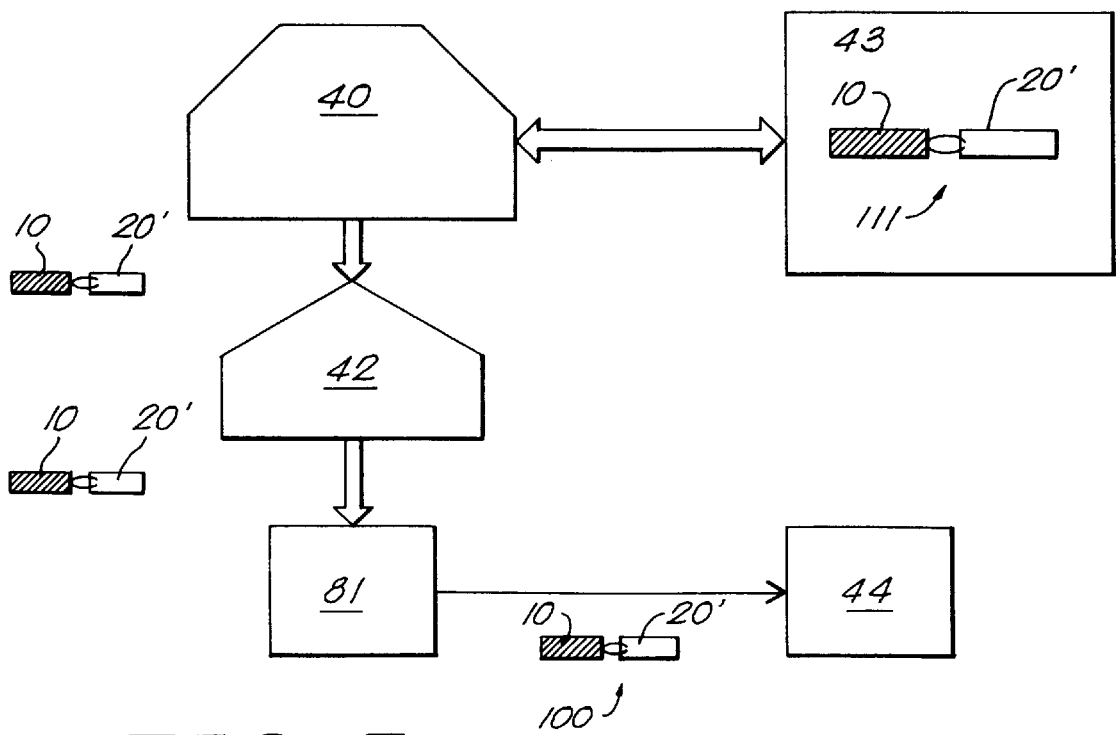

If the central bank 40 is satisfied with the authenticity of the data packet 110 being inspected, it transforms it into an inspected state 100. To do so, the central bank 40 replaces the data packet's transfer authorization number 30 with a new validation check number 20' as shown in FIG. 7B. This validation check number is typically different from the validation check number 20 attached to the data packet when it was last in an inspected state. The central bank then updates the validation database by replacing the data packet's previous validation check number 20 with this new validation check number 20'. Finally, the central bank 40 transmits the data packet 100, now restored to an inspected state, back to the transferee terminal 44 by way of the inspecting terminal.

Figure 8A:
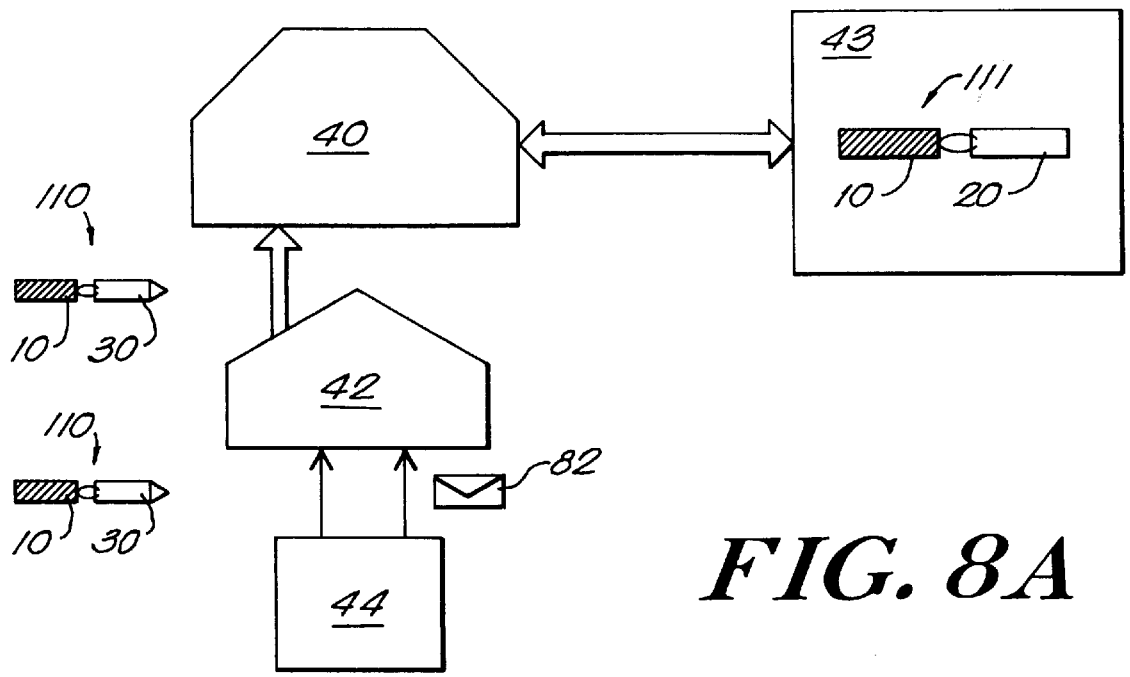
Figure 8B:
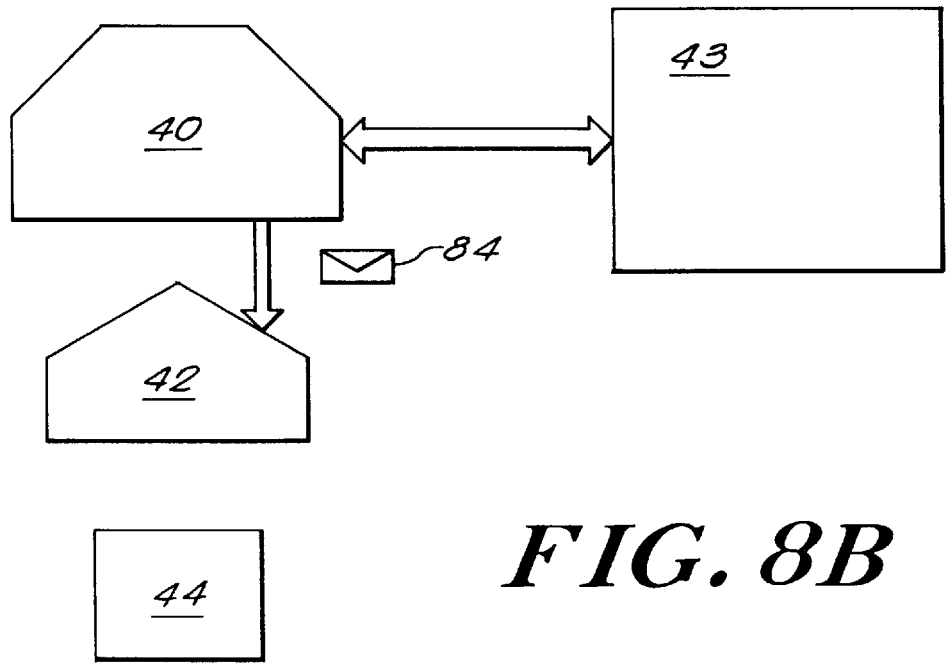

As an alternative to further negotiating the data packet, the transferee terminal can surrender the data packet in exchange for credit in an account at a financial institution equal to the value specified by the negotiated value field 39 in the transfer authorization number 30 of the data packet. This transaction, shown in FIGS. 8A and 8B, begins when the transferee terminal presents the data packet 110, together with instructions 82 on what account to credit, to an account custodian 42. The account custodian 42 surrenders the data packet to the central bank 40 with instructions to withdraw the data packet from circulation and to credit the account custodian 42 with value corresponding to that encoded in the data packet 110. The central bank 40 then inspects the data packet 110 as set forth above. If the data packet 110 passes inspection, the central bank 40: credits the account custodian 42 with the value encoded in the data packet; removes the data packet's corresponding entry 111 from the validation database 43; and transmits a message 84 to the account custodian 42 to indicate that its account has been credited. The account custodian then credits the account specified by the instructions 82 from the transferee terminal 44.

Having described the invention, what is claimed as new and secured by Letters Patent is:

1. A data packet created by an issuing module at the request of a requesting module, said data packet being representative of a cash note and comprising encrypted identifying means for uniquely identifying said data packet, said encrypted identifying means including a representation of an original face value;

cleartext identifying means including a representation of a current face value less than or equal to said original face value and specifying an inspection state of said data packet, said inspection state being switchable between an inspected state having a transfer authorization key and an uninspected state having a hash code derived from said transfer authorization key.

2. A data packet representative of a cash note and adapted for secure transfer from a transferor terminal having a signature to a transferee terminal, said data packet comprising encrypted identifying means permanently identifying said data packet;

cleartext identifying means specifying an inspection state switchable between an uninspected state in which said transfer from said transferor terminal to said transferee terminal is restricted and an inspected state in which said transfer from said transferor terminal to said transferee terminal is unrestricted.

3. The data packet of claim 2 wherein said cleartext identifying means includes a field in which said transferor terminal can affix said signature.

4. The data packet of claim 3 wherein said signature comprises a hash code derived from said cleartext identifying means in its inspected state.

5. A method for inspecting a data packet in possession of a holder upon transmission of a request from said holder to an inspector having an associated inspection database containing records of valid data packets, said data packet representative of a cash note and having a first encrypted identification means permanently identifying said data packet, said encrypted identification means including a representation of an original face value;

a first cleartext identification means specifying an inspection state switchable between an inspected state and an uninspected state, said cleartext identification means indicating that said data packet is in an uninspected state;

a corresponding data packet in said inspection database, said corresponding data packet having a second encrypted identification means identical to said first encrypted identification means and having a second cleartext identification means indicating that said corresponding data packet is in an inspected state, said second cleartext identification means having means to independently generate said first cleartext identification means;

said method comprising the steps of:

transferring said data packet from said holder to said inspector, verifying that said data packet has a corresponding data packet in said inspection database, verifying that said data packet is in an uninspected state, verifying that said current face value of said data packet is less than or equal to said original face value of said data packet, independently generating said first cleartext record from said second cleartext record, verifying that said first cleartext record and said independently generated first cleartext record are identical, altering said first cleartext record to indicate that said data packet is in an inspected state, and replacing said second cleartext record with said altered first cleartext record, transmitting said data packet from said inspector to said holder, such that said data packet in possession of said holder includes a cleartext record identifying said data packet as an inspected data packet.

6. The method of claim 5 wherein said step of independently generating said first cleartext record from said second cleartext record comprises the steps of:

reading an identifying field from said first cleartext record, reading a transfer authorization key from said second cleartext record, and applying a hash coding function to said identifying field and said transfer authorization key to generate a hash code, said hash code being identical to a corresponding hash code on said first cleartext record.

7. The method of claim 6 wherein said step of altering said first cleartext record to indicate that said data packet is in an inspected state comprises the steps of:

deleting said corresponding hash code from said first cleartext record, deleting said identifying field from said first cleartext record, generating a transfer authorization key, and adding said transfer authorization key to said first cleartext record.

8. A method for negotiating a data packet in the possession of a transferor module having data processing means to a transferee module, said data packet representative of a cash note having an inspection state switchable between an uninspected state and an inspected state and set to the inspected state;

an encrypted record uniquely identifying said data packet; and a cleartext record specifying said inspection state of said data packet, said cleartext record including a transfer authorization key;

method comprising the steps of:

reading said transfer authorization key, with said data processing means, from said cleartext record, writing with said data processing means, an identifying field to said cleartext record, generating with said data processing means, a signature based on said transfer authorization key and said identifying field, writing, with said data processing means, said signature to said cleartext record, thereby indicating that said data packet is in an uninspected state, transmitting said data packet to said transferor module such that said inspected data packet in possession of said transferor module becomes an uninspected data packet in possession of said transferor module.

9. A system for the secure transfer of a data packet representative of a cash note having an encrypted record uniquely identifying said data packet, a cleartext record specifying an inspection state switchable between an inspected state and an uninspected state, and a circulation state switchable between a circulating state and a non-circulating state, said system comprising:

a central bank terminal for issuing said data packet, said central bank terminal maintaining a record for said data packet and having means to authenticate said data packet and means to alter said inspection state of said data packet from being in an uninspected state to being in an inspected state;

an account custodian terminal for receiving said data packet issued by said first database system, said account custodian terminal having means to alter said circulation state of said data packet from being in a circulating state to being in a non-circulating state;

a personal terminal for receiving said data packet from said account custodian system, said personal terminal having means to alter said inspection state of said data packet from being in an inspected state to being in an uninspected state such that said data packet issued by said central bank terminal is placed into circulation by said account custodian terminal upon being transferred by said account custodian terminal to said personal terminal.

10. A method for negotiating a data packet from a transferor module to a transferee module, said data packet representative of a cash note and having:

an inspection state switchable between an inspected state and an uninspected state and set to an inspected state, an encrypted record uniquely identifying said data packet, and a cleartext record specifying said inspection state, said method comprising the steps of:

generating a signature based on said cleartext record;

changing said inspection state of said data packet by writing said signature to said cleartext record;

transmitting said data packet to said transferee module.

11. A method for circulating a data packet representative of a cash note, said data packet being switchable from an inspected state to an uninspected state, said method comprising the steps of:

transferring said data packet, in an inspected state, from a central bank to an account custodian, transferring said data packet from said account custodian to a first terminal, changing said data packet at said first terminal from an inspected state to an uninspected state, transferring said uninspected data packet to a second terminal, changing said uninspected data packet at said second terminal into an inspected data packet, transferring said inspected data packet from said second terminal to said account custodian, transferring said inspected data packet from said account custodian to said central bank, and removing said data packet from circulation.

12. A method for inspecting a data packet in possession of a holder, said data packet representative of a cash note and having an inspection state switchable between an inspected state and an uninspected state and a signature generated by said holder, said signature being based on said inspected state of said data packet, said method comprising the step of verifying that said signature is consistent with said inspected state of said data packet, altering said data packet to indicate that said data packet is in an inspected state so that said data packet in possession of said holder is in an inspected state.

13. A system for the secure transfer of a data packet representative of a cash note, said data packet having an encrypted record uniquely identifying said data packet, a cleartext record specifying an inspection state switchable between an inspected state and an uninspected state, said system comprising:

a central bank system for issuing said data packet, said central bank system maintaining a record for said data packet and having means to authenticate said data packet and means to alter said inspection state of said data packet from being in an uninspected state to being in an inspected state, a terminal for receiving said data packet from said central bank system, said terminal having means to alter said inspection state of said data packet from being in an inspected state to being in an uninspected state.

* * * * *